(12) United States Patent
Harel et al.

(10) Patent No.: US 7,364,082 B2
(45) Date of Patent: Apr. 29, 2008

(54) PORTABLE SCANNER MODULE

(75) Inventors: Dan Harel, Rochester, NY (US); Douglas B. Beaudet, Geneseo, NY (US); Joseph A. Manico, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 480 days.

(21) Appl. No.: 10/877,384

(22) Filed: Jun. 25, 2004

(65) Prior Publication Data
US 2005/0286091 A1 Dec. 29, 2005

(51) Int. Cl.
G06F 17/00 (2006.01)

(52) U.S. Cl. .............. 235/462.15; 235/462.24

(58) Field of Classification Search ........ 358/474, 358/505, 506, 501, 1.15; 235/462.15, 462.24; 361/683
See application file for complete search history.

(56) References Cited

U.S. PATENT DOCUMENTS

| | | |
|---|---|---|
| 3,739,095 A | 6/1973 | Alden |
| 5,644,663 A | 7/1997 | Saito et al. |
| 6,271,939 B1 | 8/2001 | Hu et al. |
| 7,119,835 B2 * | 10/2006 | Gennetten et al. ....... 348/207.2 |
| 2002/0154342 A1 * | 10/2002 | Haining ............. 358/474 |
| 2002/0196477 A1 | 12/2002 | Chen |

FOREIGN PATENT DOCUMENTS

EP 0 830 000 A2 3/1998

OTHER PUBLICATIONS

Corex Technologies, CardScan, www.corex.com.
CardReader, Inc., BizCard Reader, www.bizcardreader.com.
CNF Mobile Solutions, Inc., TravelScan.

* cited by examiner

Primary Examiner—Ahshik Kim

(57) ABSTRACT

Scanner modules are provided for use with a docking station having a docking station interface adapted to receive an interface of an imaging device; the scanner module has an image-scanning unit adapted to form an image of a medium; a controller to controllably cause the image scanning unit to capture an image of the medium and to store the captured image as image data in a memory; and a scanner interface adapted so that it can be received by the docking station interface. The controller is connected to the scanner interface and adapted to send image data from the memory through the docking station interface in a manner that emulates the manner in which the imaging device sends image data through the docking station interface. Some embodiments of the scanner module can be manually or automatically moved to scan mediums.

27 Claims, 13 Drawing Sheets

PORTABLE SCANNER MODULE

FIELD OF THE INVENTION

This invention involves the field of consumer digital photography, in particular image scanning devices.

BACKGROUND OF THE INVENTION

Digital photography has become increasingly popular way for consumers to enjoy picture taking. One particular advantage of digital photography is the ability to easily create and manage large collections of images using the electronic sorting and organizing capabilities provided by the personal computers that are typically used to manage and store such collections. Digital images are conveniently added to home collections using, for example, devices such as the Kodak EASYSHARE™ camera dock 6000 which provide a convenient way for a consumer to transfer image files from a camera to a computer while also conveniently providing an opportunity to recharge the battery stored in the camera so that the camera is ready for future use. Similarly, the Kodak EASYSHARE™ printer dock 6000A provides a docking capability that allows users to easily transfer images from a camera to a computer and also provides a high quality thermal image printer that can be used to generate images with or without the involvement of a personal computer.

Both the EASYSHARE™ 6000 AND EASYSHARE™ 6000A docking stations have been exceptionally well received in the marketplace based upon the efficiency and ease with which they facilitate the tasks of uploading images from a camera to a computer and printing such images.

Another advantage of both the EASYSHARE™ 6000 and EASYSHARE™ 6000A docking stations is that they provide an interface to digital cameras that recharges batteries in the camera during image transfer and afterward. The interface is capable of transferring an amount of power that is sufficient to recharge camera batteries over a period of time and, in the case of the EASYSHARE™ 6000A to operate the camera to permit printing of images stored therein.

It will be appreciated that it is not necessary to capture images in digital form in order for the images to be incorporated into a digital collection. For example, images that are captured on film can be automatically scanned into digital form by a photofinisher and stored electronically in online or local collections or can also be stored on memory devices or digital media such as Compact Disks (CDs) and Digital Versatile Disks (DVDs) that can be quickly uploaded to a computer database. This allows conventional film-based photography to provide both the advantages of digital photography and conventional photography and this, in turn, encourages consumers to select a format for image capture that provides the best combination of cost, performance and convenience.

It will also be appreciated many consumers have extensive collections of images that are recorded on tangible mediums such as image bearing mediums on paper, slides and/or negatives. Many of these images are of great importance to photographers and to families. However for such images to be incorporated into a digital image collection such images must be converted into digital form.

There are a number of options available for consumers who have collections of images that are recorded on tangible mediums to convert such images into digital form. Typically, these options involve the use of a computerized digital image scanning system. There are both retail and home versions of such systems. One example of a retail version of such a computerized digital image scanning system is the Kodak Picture Maker Kiosk. This device allows consumers to scan photographic image bearing mediums, slides, and/or negatives and to produce image files that can be transmitted, used for collections and/or stored on memory devices and digital media. The Kodak Picture Maker Kiosk also enables a consumer to make printed copies of the image information contained in the photographic image bearing mediums, slides, or negatives.

Examples of home-computerized digital image scanning systems include personal computers equipped with so-called flat bed scanners. In flat bed scanners, images recorded on paper or in some other generally flat form are placed on a glass scanning platen and scanning equipment scans an area of the platen. Such flat bed scanners can scan various sizes of "flat art" including images, documents, artwork, and the like by being set up to physically accommodate the largest of the intended sizes. These devices are typically configured to handle documents which are typically 8.5"×11" or A4 in size or smaller making the units large and impractical for casual transport as compared to a point and shoot digital camera that can be transported easily in a pocket or purse. These scanners can also include a variety of attachments to provide document transport functions to enable batch scanning of large numbers of images and negative and slide scanning.

Typically these flat bed scanners are configured as desktop computer peripheral devices and therefore they incorporate various data communication, control and power conversion structures suitable for such use. Some scanners of this type can operate independently from the computer when used as a component for an "all-in-one" device also incorporating a printer and modem to provide copying and faxing capabilities. However, scanners of this type typically do not include portable power supplies and have no removable memory storage capabilities when not connected to a computer.

Print scanners come in various sizes to accommodate different sizes of "flat art" including images, documents, artwork, and the like. When scanning documents that are larger that the scan aperture, it is known to use "digital stitching algorithms" to combine multiple overlapping sections of an image into a complete seamless digital image. Because many images are recorded on tangible mediums that are stored in photo albums with image bearing mediums adhered to pages with many different techniques using glues, adhesives, and tapes, removal of these image bearing mediums from the photo albums would be labor intensive, time consuming, and could subject fragile, one of a kind, images to potential damage. Since photo albums typically are formed by bound pages it would not be possible to scan these pages with a smaller format scanner with an incorporated print feed mechanism. In addition, when attempting to scan bound albums with a typical flat bed scanner, damage to the binder, binding means, and/or book spine could occur when pressing an opened album against the scan aperture. Finally, transporting a large format document scanner, that is not capable of operating independently from a computer, to an event such as a family holiday celebration in order to copy images from a bound photo album would be difficult if not impractical.

Another problem with such flat bed scanning systems and other known scanning devices for scanning a document having an image recorded thereon is that such systems are often difficult to operate, are non-intuitive and generate images in a manner that is difficult for the non-regular user to incorporate into existing collections.

Another popular example of a home computerized digital imaging system is the sheet-fed type scanner. In sheet-fed scanners a document slide, transparency, business card, or other media to be scanned is placed in a feeder system and is moved relative to a scanning head which is typically a linear array scanner imager. Sheet fed scanners are capable of scanning large volumes of documents by automatically passing the documents through the feeder system in a serial fashion. However, the feeding systems on such sheet fed scanners are typically not well adapted to receive oversize media or media that is of uneven thickness. Such systems also typically do not have portable power supplies and must be connected to a personal computing system to allow for image processing and storage.

A further popular example of a home-computerized digital imaging system includes a class of so-called hand-held scanners. One example of such a hand-held scanner is the QuickLink Pen Scanner from Wizcom Technologies. The QuickLink Pen scanner is a pen-shaped scanner that enables a user to scan and store printed text, tables and charts on a printed page using local memory and to transfer the data that is scanned to a computer, PDA or cell phone. The scanned information can be directly transferred from the pen scanner to any personal computer application in real-time. The QuickLink Pen scanner is also capable of storing up to 1000 pages of text data. This text data can be transferred through an infrared or serial port. A built-in Character Bar on the QuickLink allows text to be input manually.

This pen type of scanner however, while well adapted for scanning lines of text, is not easily used to capture images as it lacks the color image resolution capabilities, the graphics image processing capabilities and memory capacity for high quality image scanning. Further, such a pen type image scanner provides a relatively small sized image capture area such that even if these limitations are overcome, capturing even a modestly sized image would require many scanned passes over the image to capture image information for the entire image. This in turn requires a very effective stitching algorithm to derive a high quality image from such scanned data.

What is needed therefore is a scanning device that can be used to scan images from a wide variety of image bearing mediums. What is also needed is a scanning device that provides a flexible and effective platform for image scanning that can be efficiently used to scan images that are of irregular configuration and that can also be used to effectively scan images that are of a conventional size or configuration.

Such a scanning device should be readily useable with other imaging technology, such as personal computers and devices such as docking stations. Thus, what is also needed is a scanning system and method that is compatible with existing computer and imaging hardware to minimize the number of independent connections that must be made to a computer to facilitate image transfer. Such a scanning system and method operates in a fashion that is consistent with the operation of other image capture devices.

SUMMARY OF THE INVENTION

In a first aspect of the invention, a scanner module is provided for use with a docking station having a docking station interface adapted to receive an interface of an imaging device; the scanner module has an image scanning unit adapted to form an image of a medium; a controller to controllably cause the image scanning unit to capture an image of the medium and to store the captured image as image data in a memory; and a scanner interface adapted so that it can be received by the docking station interface. The controller is connected to the scanner interface and adapted to send image data from the memory through the docking station interface in a manner that emulates the manner in which the imaging device sends image data through the interface.

In another aspect of the invention, a scanner module is provided. The scanner module has a scanner body having an image scanning unit with an imager and associated circuits capable of forming images of a medium; a scanner interface adapted so that it can be received by the docking station interface; and a controller adapted to operate the image scanning unit to controllably cause the image scanning unit to capture images of the at least one medium and to store the captured images as image data in a memory, the controller being connected to the scanner interface and adapted to exchange data with another electronic device by way of the interface. A power source is operatively connected to the image scanning unit and the controller to provide power sufficient to scan at least one image and to store at least one image in the memory. The body is adapted to separably engage the base to define a medium transport path between the base and the scanner body.

DETAILED DESCRIPTION OF THE INVENTION

Figure 1:
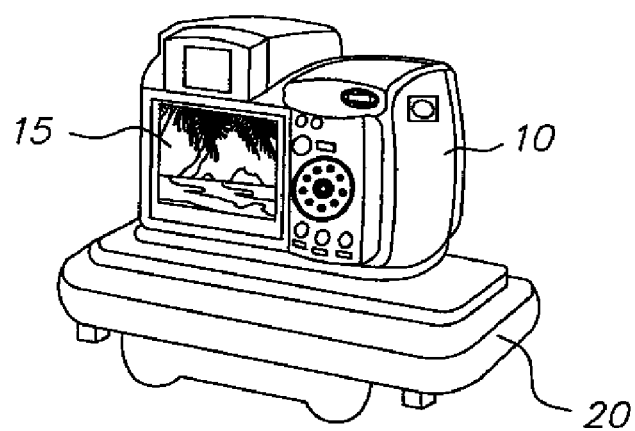
FIG. 1 is a perspective illustration of a prior art digital camera attached to a digital camera charging and image transfer dock.
Figure 2:
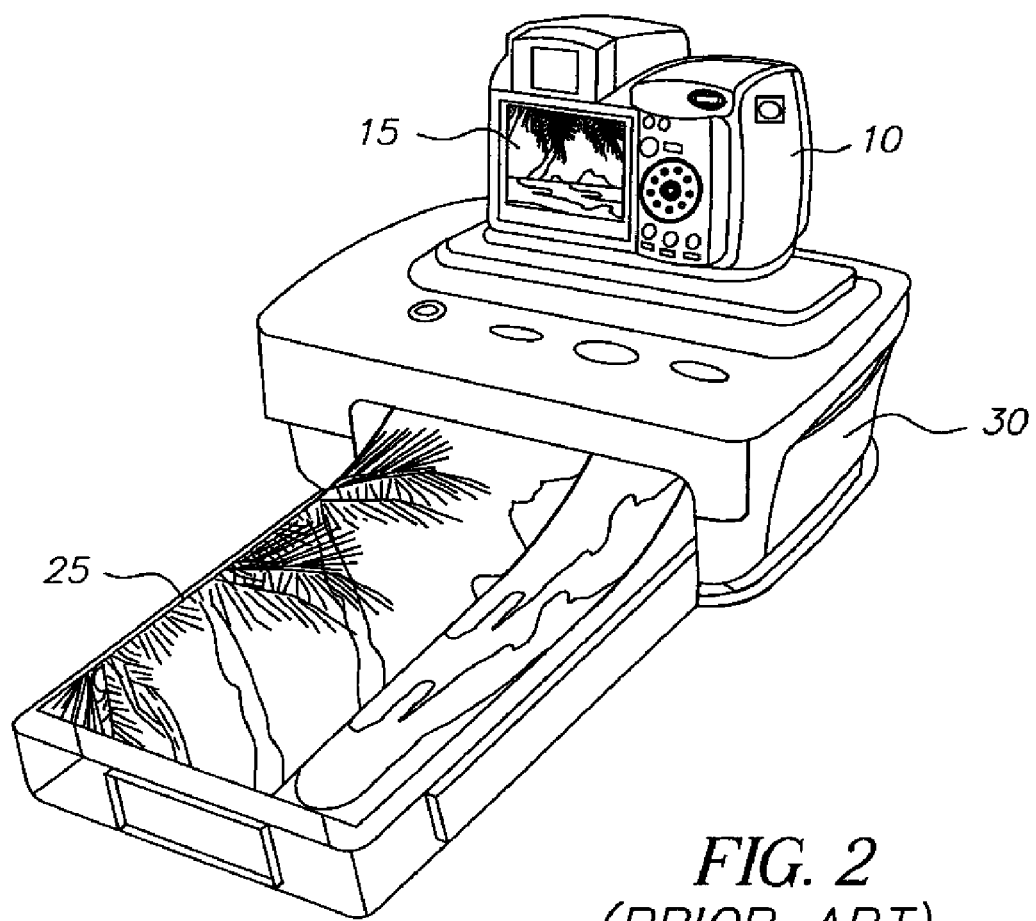
FIG. 2 is a perspective illustration of a prior art digital camera attached to a digital camera charging, printing, and image transfer dock, in the process of transferring and printing an image.

FIG. 1 is a perspective illustration of a prior art digital camera 10, with displayed digital image 15. Camera 10 is connected to a camera charging and image transfer dock 20. FIG. 2 is a perspective illustration of a prior art digital camera 10 with displayed image 15 connected to camera charging, image transfer, and printing dock 30. Digital print 25 has been generated from a digital file obtained from camera 10 and represented as camera screen digital image 15.

Figure 3:
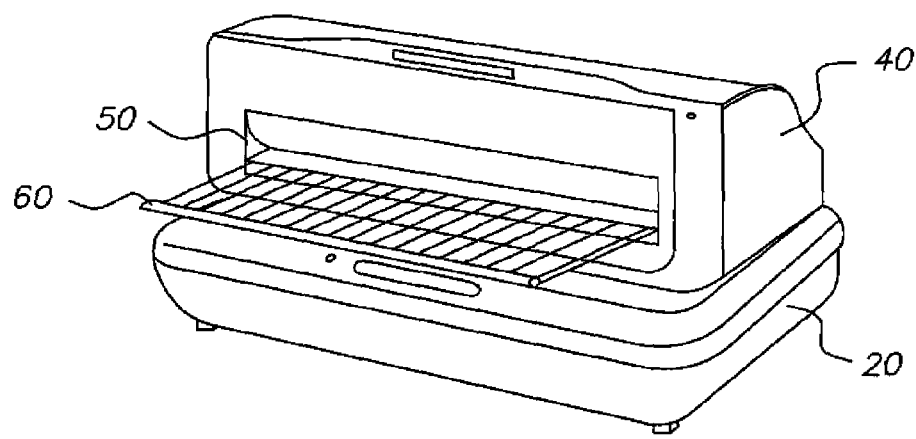
FIG. 3 is a perspective illustration of a portable scanner module attached to a digital camera charging and image transfer dock.

FIG. 3 is a perspective illustration of one embodiment of a portable scanner module 40 connected to camera recharging and image transfer docking station 20. As is shown in FIG. 3, in this embodiment, a print feed slot 50 used in conjunction with print feed guide 60 to receive original images (not shown) into portable scanner module 40 for scanning. In the embodiment shown, feed guide 60 is pivotally connected to a body 42 of printer scanner module 40, and is in an open position allowing original images (not shown) to be inserted into feed slot 50 and supporting such images.

FIG. 4 depicts the portable scanner module 40 of FIG. 3 shown removed from docking station 20 revealing one embodiment of docking station interface 70 adapted, in this embodiment, to engage a mating camera interface (not shown) on digital camera 15. Docking station interface 70 provides electrical, optical, or other connections (not shown) that enable data communication between docking station 20 and a digital camera 15 when such a digital camera 15 that is joined thereto as shown in FIG. 1. Docking station interface 70 also provides a supply of power that is received by camera 15. This supply of power is calibrated for two purposes: to provide sufficient operational power to camera 15 to allow camera 15 to transfer digital images or other data stored therein to a computer and to recharge rechargeable batteries (not shown) incorporated into digital camera 15 over a period of time.

In one embodiment of the invention, docking station interface 70, is adapted to exchange data and provide power in accordance with the standards established by the Universal Serial Bus standard. This standard allows a device such as a personal computer to provide power to a peripheral device such as digital camera 15. However, the amount of power that can be delivered consistent with the Universal Serial Bus standard is limited and is typically insufficient to support scanner operation. Docking station interface 70 can be adapted to exchange data using other standard forms of data exchange and can be adapted to exchange data in manners that are consistent, for example, with the RS-232 standard or the fire wire IEEE 1394 standard.

Figure 4A:
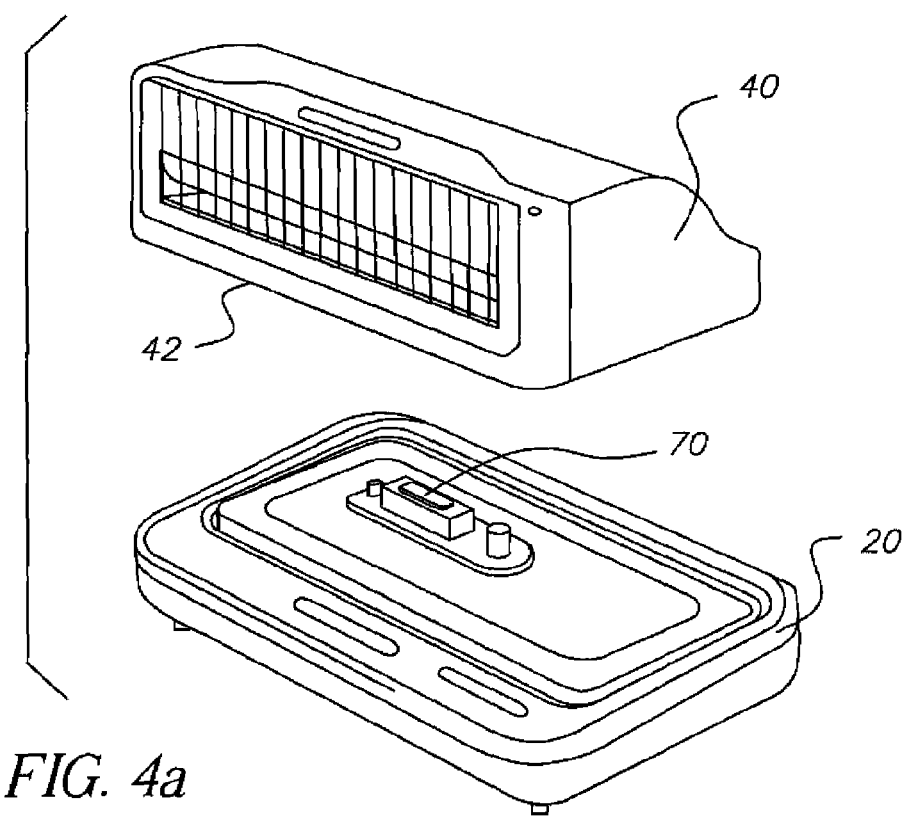
FIG. 4a is a perspective illustration of a portable scanner module removed from a digital camera charging and image transfer dock.
Figure 4B:
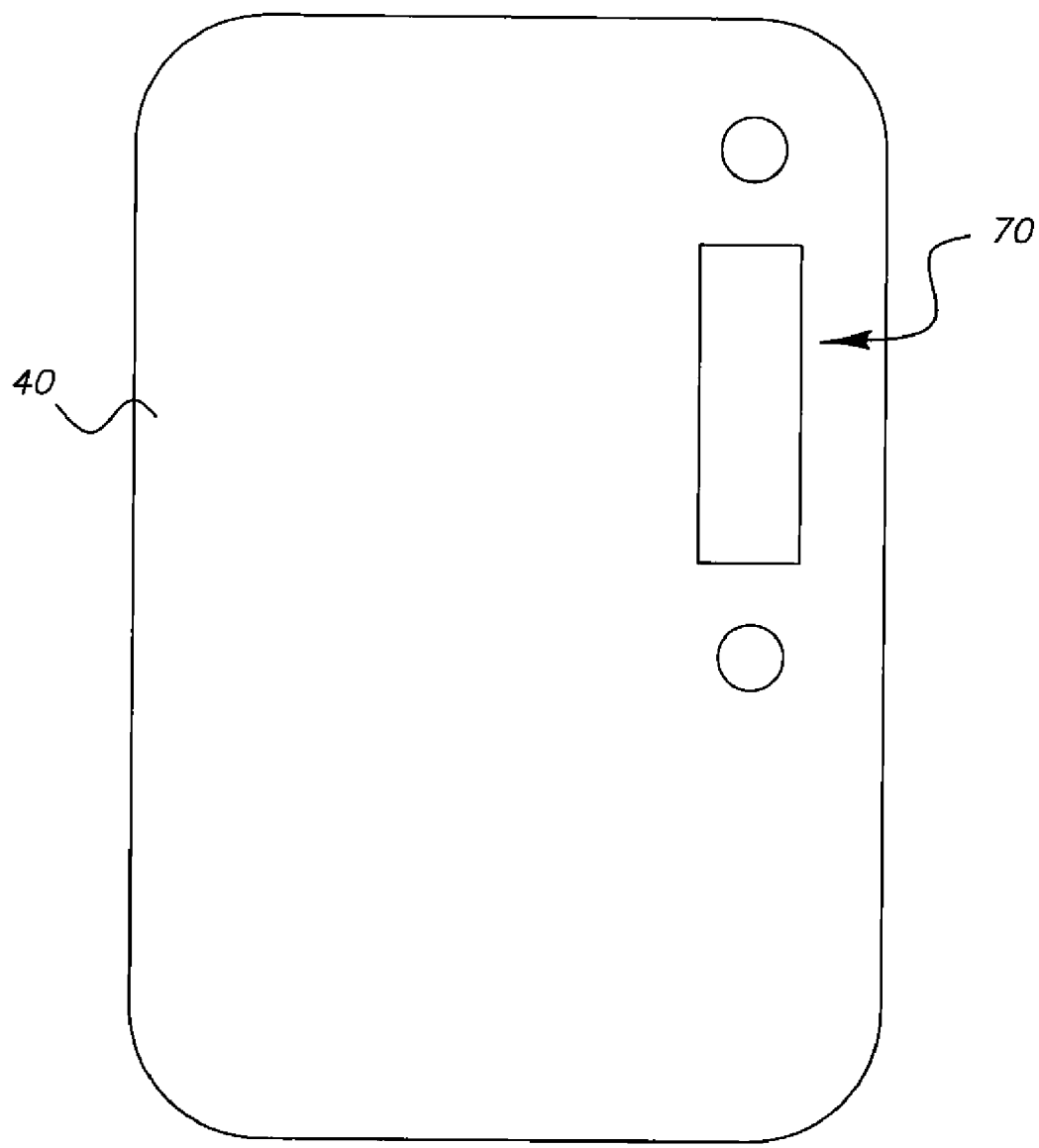
FIG. 4b is a bottom perspective illustration of an example of a scanning module showing the scanning module interface.

It will be appreciated that, in practice, the location, size, type and configuration of docking station interface 70 will be determined based in part upon the location, size, type and configuration of a corresponding camera interface (not shown) that dock 20 is intended to engage. Accordingly, portable scanning module 40 has a scanner interface 44 shown in FIG. 4b which depicts a bottom, side perspective view of one embodiment of portable scanning module 40 having a location, size, type and configuration of scanner interface 44 that corresponds generally to the location, size, type and configuration of the camera interface 70 of a camera 10 for which docking station 20 has been co-designed. In this way, docking station 20 can be used both with camera 10 and scanner module 20. As is also shown in FIG. 4a, feed guide 60 is in a closed position protecting feed slot 50 from damage during transport or storage.

Figure 5:
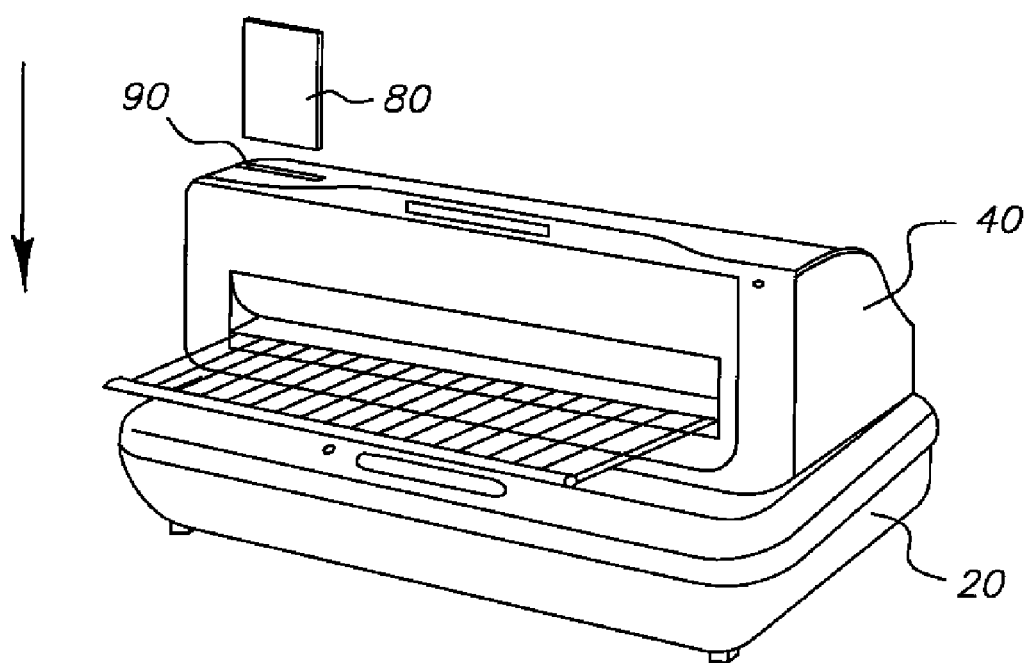
FIG. 5 is a perspective illustration of a portable scanner module attached to a digital camera charging and image transfer dock and a removable memory device prior to insertion.

FIG. 5 illustrates a removable memory device 80 being inserted in removable memory device slot connector 90. In the embodiment shown, removable memory device 80 comprises a removable semiconductor memory. However, in other embodiments, removable memory device 80 can comprise any form of removable data storage device including but not limited to optical, magnetic and/or other known data storage devices.

Figure 6:
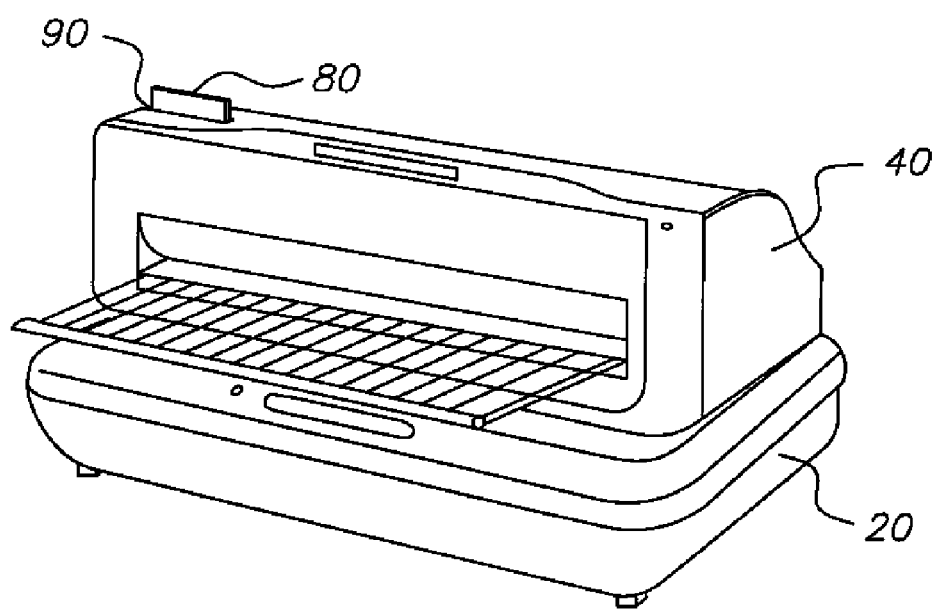
FIG. 6 is a perspective illustration of a portable scanner module attached to a digital camera charging and image transfer dock with removable memory device inserted into the portable scanner module.

FIG. 6 illustrates removable memory device 80 seated in removable memory device slot connector 90.

Figure 7:
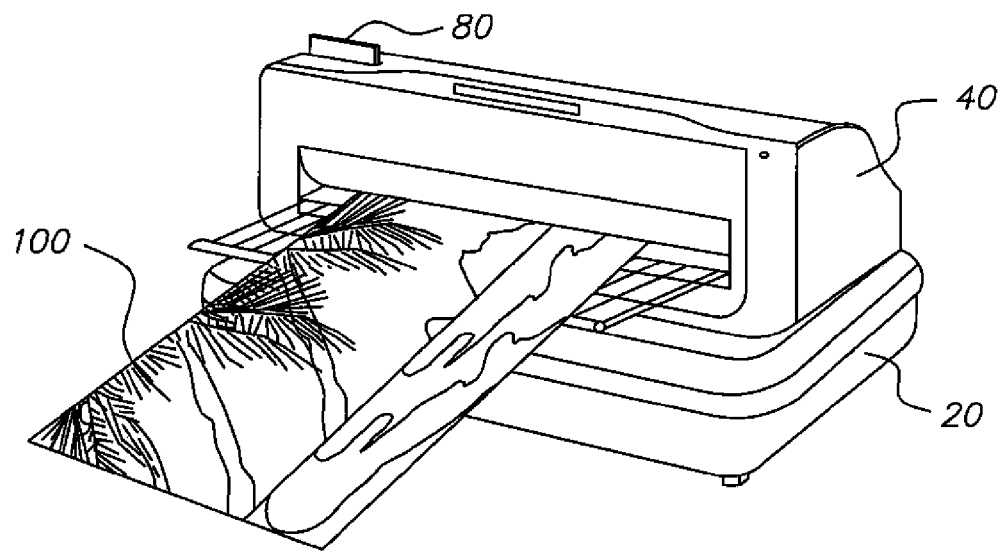
FIG. 7 is a perspective illustration of a portable scanner module attached to a digital camera charging and image transfer dock in the process of transporting and scanning a print.

FIG. 7 depicts a conventional image bearing medium 100 being fed into print feed slot 50 of portable scanner module 40 for scanning and conversion into a scanned image file which is connected to dock 20 which is connected to a computer (not shown). In this mode of operation, the user would have the option to direct the scanned image file to the computer memory or to the connected removable memory device 80.

Figure 8:
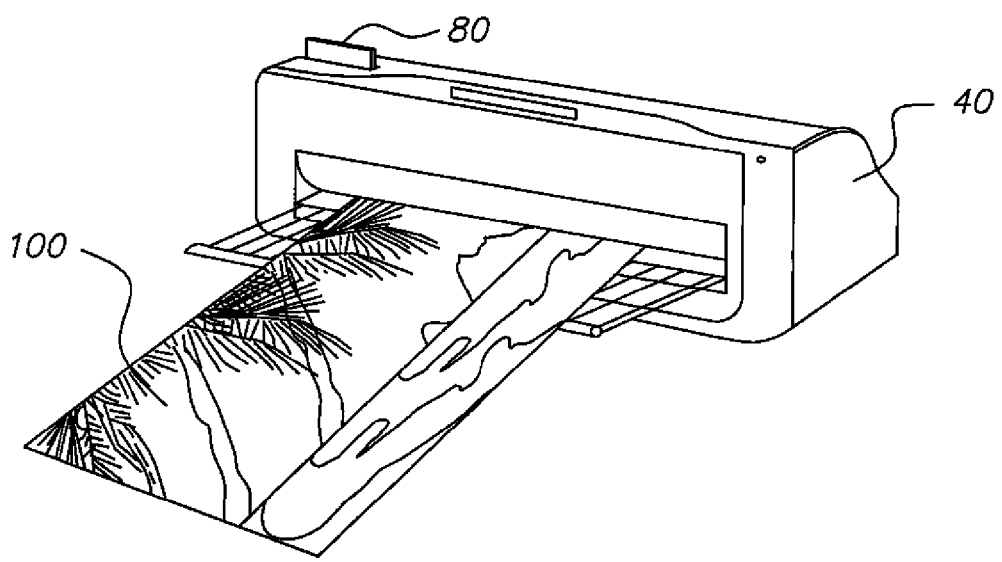
FIG. 8 is a perspective illustration of a portable scanner module in the process of transporting and scanning a print.

FIG. 8 depicts portable scanner module 40 scanning print 100 in the unconnected mode. In this mode image bearing medium 100 is scanned and the resultant digital file is stored in removable memory device 80. The file labeling convention and format such as jpeg format, used to store the image file on the removable memory device, could be similar to those employed by digital cameras.

Figure 9:
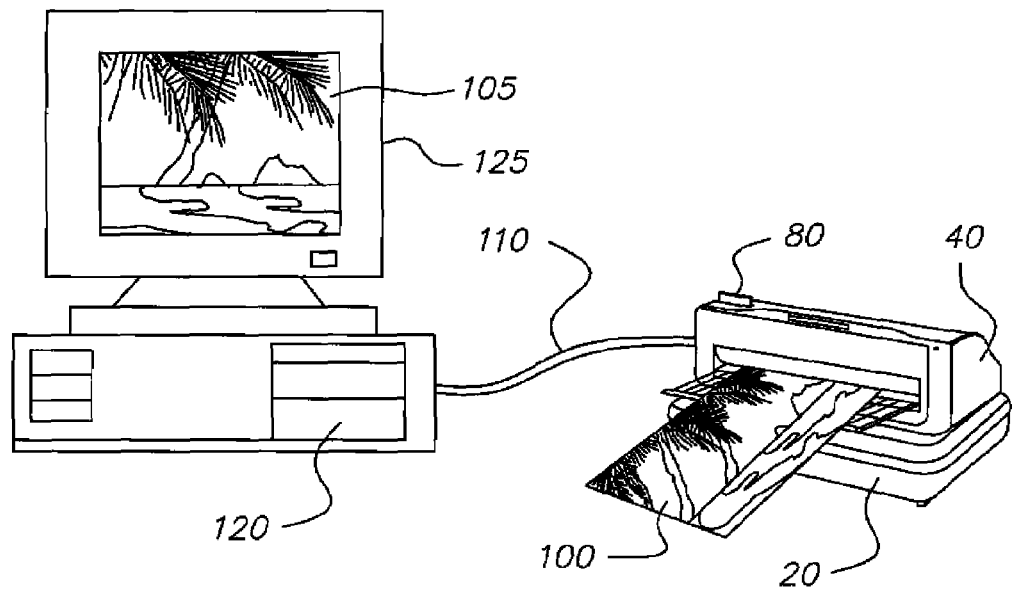
FIG. 9 is a perspective illustration of a portable scanner module attached to a digital camera charging and image transfer dock, which is connected to a computer, in the process of transporting, scanning, and transferring a print.

FIG. 9 depicts portable scanner module 40 connected to dock 20 and scanning an image bearing medium 100. The resultant image file can be directed to removable memory device 80 and/or computer 120 via digital signal cable 110. Cable 110 can comprise a USB type, RS 232 type, IEEE 1394 or firewire type or other type used to transfer digital information. The scanned "soft display" image 105 is displayed on a monitor 125 of computer 120.

Figure 10:
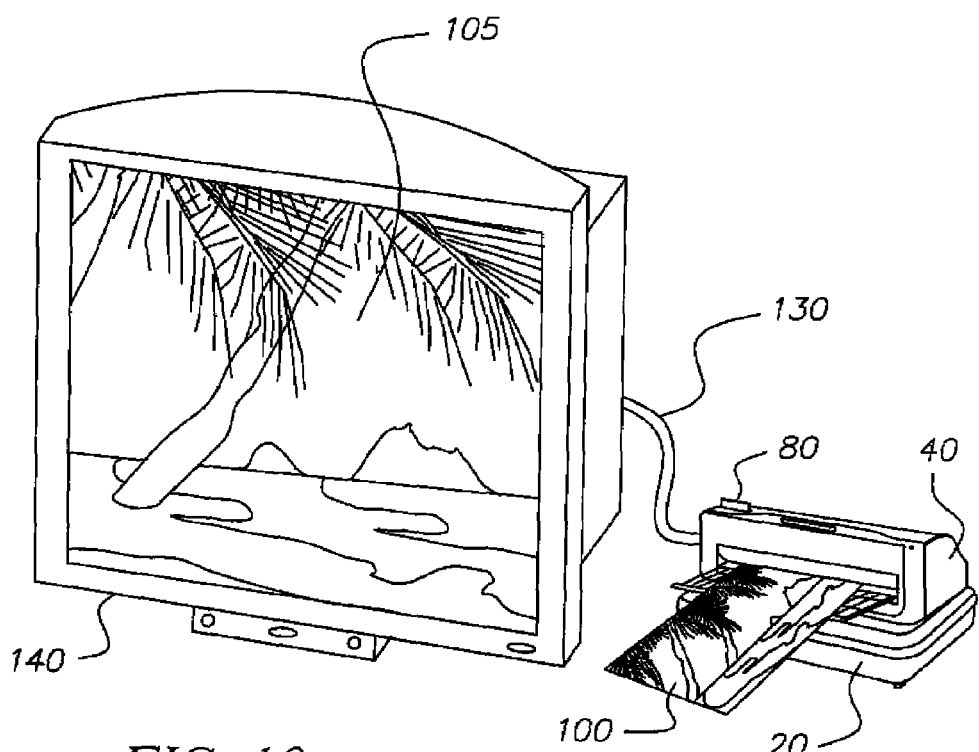
FIG. 10 is a perspective illustration of a portable scanner module attached to a digital camera charging and image transfer dock, which is connected to a television monitor, in the process of transporting, scanning, and transferring a print.

FIG. 10 also shows portable scanner module 40 connected to dock 20. Dock 20 is providing power to the portable scanner module 40 via docking station interface 70 (not shown). Print 100 is being scanned and the resultant image file will be stored in removable memory device 80. An analog image is being sent to television monitor 140 via an analog or digital television signal cable 130 connected to potable scanner module 40. The analog image signals or digital image signals can be generated by controller 32 so that soft display image 105 appears on television monitor 140.

Figure 11:
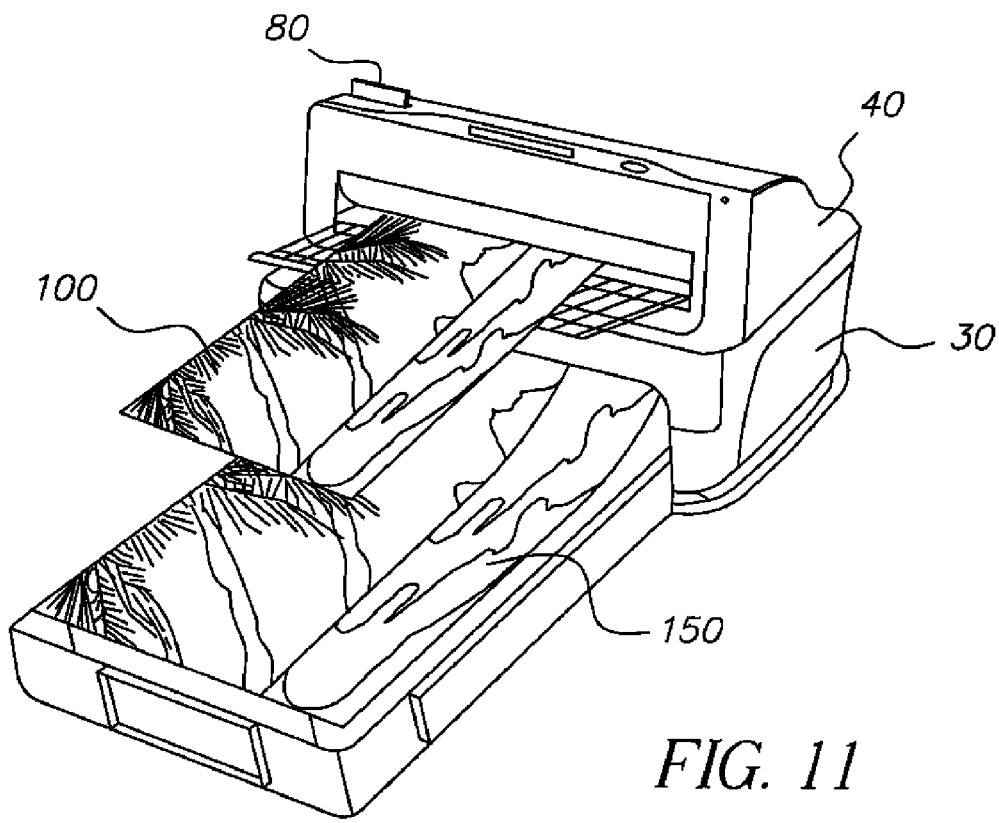
FIG. 11 is a perspective illustration of a portable scanner module attached to a digital camera charging, printing, and image transfer dock, in the process of transporting, scanning, and transferring a print. The printer is in the process of printing a duplicate print.

FIG. 11 shows portable scanner module 40 connected to printing dock 30 with an image bearing medium 100 being scanned and a duplicate print 150 generated based upon the image from the scanned image-bearing medium. Printing dock 30 is not attached to a computer and is operating in the autonomous mode, by printing any file it receives. The user would have the option to save the resultant image file to removable memory device 80 or not to save the file after duplicate print 150 has been generated.

Figure 12:
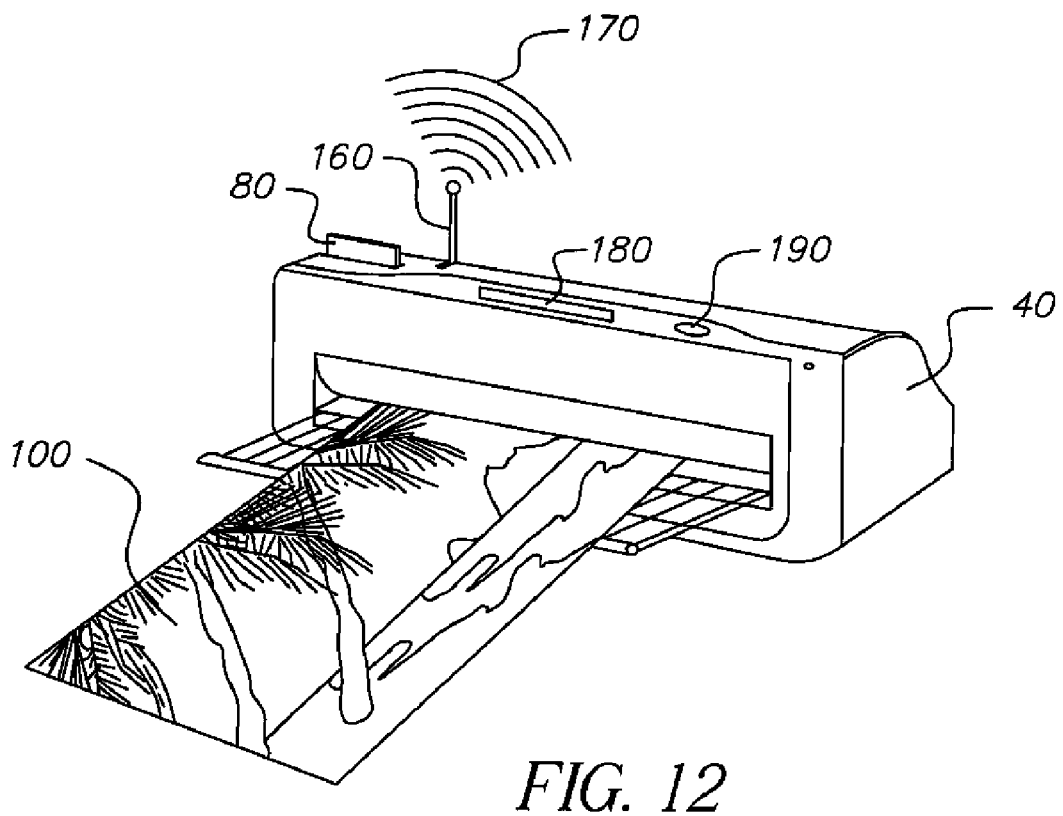
FIG. 12 is a perspective illustration of a portable scanner module in the process of transporting and scanning a print and using an optional wireless image transfer attachment.

FIG. 12 illustrates portable scanner module 40 in the process of scanning image-bearing medium 100. Also illustrated are examples of user interface 180 and indicator light 190 used respectively to initiate a scan or to direct an image file to storage and to indicate when an operation has been completed. An optional RF wireless data communication system 160 has been added to portable scanner module 40 illustrated in FIG. 11. As illustrated, RF data transmitter 160 is generating an RF data signal 170. This signal can carry data representing the image scanned to a wirelessly enabled image storage device, such as a cellular phone, a person digital assistant, an image viewer, a wireless router or network, a printer, a personal computer, and the like. The user would also have the option of storing the resultant image on removable memory device 80.

Figure 13:
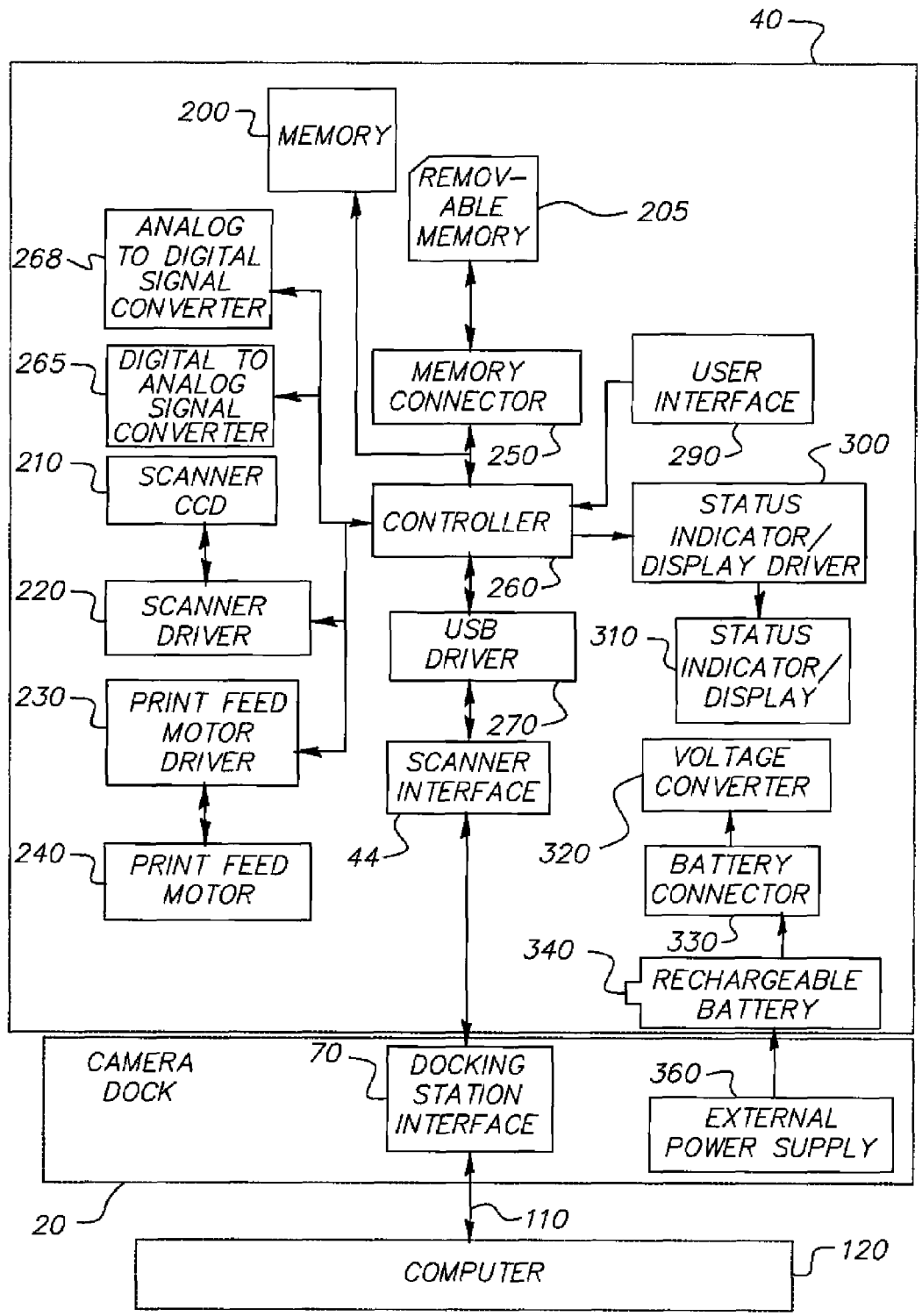
FIG. 13 is a schematic diagram of a portable scanner module attached to a digital camera charging and image transfer dock.

FIG. 13 is a schematic diagram of one embodiment of a portable scanner module 40 attached to a digital camera charging and image transfer dock 20 illustrating how the components are interconnected. As is shown in FIG. 13, portable scanner module 40 has a memory connector 250 adapted to receive memory device 200 and/or a removable memory device 205, such as a compact flash memory card, a secure digital (SD) memory card, or other semi-conductor memory, an optical memory, or magnetic memory such as a miniature hard drive or other portable memory device. Removable memory device 205 is connected to a controller 260 by way of a memory connector 250.

By incorporating this capability in the portable scanner module, the module can be configured to store image files on the removable memory directly with out connection to a computer or printing dock. This would allow a consumer to bring the portable scanner module to an event and scan legacy images directly into the removable memory device without connection to a computer or to an external power supply. In addition several card interface slots can be included and used with other compatible devices such as a Bluetooth wireless network card to allow wireless network connectivity directly from the portable scanner module.

Memory 200 and removable memory device 205 are used to store image files. The number of images is dependant on the memory capacity of the memory 200 and/or removable memory device 265 and the way in which images are captured, processed and stored. Metadata can also be stored in memory 200 and/or removable memory 205. Examples of such metadata include any form of non-image data that is associated with an image including, but not limited to, audio data, organizational data, time and date location data, and data to be used when sharing or otherwise processing the images.

Controller 260 can comprise a microprocessor, microcontroller, or any other electronic circuit adapted to govern image scanning, processing, storage and sharing processes.

Communication driver 270 is connected to controller 260 and is connected to camera dock 20 when the units are physically attached by way of a scanner interface 44. In the embodiment shown communication driver 270 is adapted to communicate using the Universal Serial Bus communication standard and, accordingly, scanner interface 44 is adapted to communicate using the USB standard and is also adapted to engage docking station interface 70.

In the embodiment shown in FIG. 13 camera connector 70 in camera dock 20 is a pass through type enabling connection of the scanning module 40 to computer 120. When connected to computer 120, image files can be sent from controller 260 directly to a memory (not shown) in computer 120. For example, as shown in FIG. 9, where there is no connection to a computer, image files can be stored in memory 200 and/or removable memory device 205 as directed by the user. The user can also choose to upload image files from a memory (not shown) in computer 120 via the scanner interface 44 to either or both of memory 200 or removable memory device 205.

In an alternative embodiment, controller 32 is adapted to provide a signal to the docking station indicating that the docking station is connected to a scanner. In this embodiment, controller 26 can also be adapted to receive signal from the docking station that are adapted for use by a scanner and not by a digital scanner 15, such as signals that relate to scanning operations.

In one embodiment of the invention, controller 260 is adapted to communicate through a printer type docking station by emulating the way in which digital camera 15 would communicate using the same docking station.

In the embodiment shown in FIG. 13, scanner interface 44 is also adapted to receive power to charge a rechargeable battery 340 in portable scanner module 40. Such a rechargeable power supply can comprise, for example, a lithium ion of nickel metal hydride battery. In this embodiment, the power supplied via the USB connection provided by computer 120 (not shown) is insufficient to power the portable scanner module 40. However, the USB supplied power is sufficient to recharge the rechargeable battery 340 over time. Rechargeable battery 340 powers the portable scanner module 40 via voltage converter 320. When rechargeable battery 340 is only partially powered, voltage converter 320 can augment power from rechargeable battery 340 with the USB supplied power to enable or to extend operation. If the portable scanner module 40 is not connected to a camera dock and the rechargeable battery 340 is depleted, then an ancillary power supply, not shown, may be used. The ancillary power supply can be a wired power supply in the form of a wall plug type power converter.

Because it has its own internal power supply module 40 can be used independent of a power supply and can be used with low output supplies typical of USB type systems by augmenting and buffering the available power. It can also be recharged as with digital camera power supplies. The portable scanner can also work detached from the dock so it could be brought to an event or destination.

To obtain images, portable scanner module 40 utilizes an image scanner 210, which is typically configured as a charge couple device (CCD) linear array. Individual lines of CCD's with the appropriate filtration and sensitivity capture red, green, and blue image signals from the image bearing mediums being scanned. Other forms of image sensors can be used such as those that use complimentary metal oxide, and charge injection devices to capture image information. Image information from image scanner 210 is provided to scanner driver 220 having appropriate driving and image processing circuits and systems of the type commonly used to convert image data from image scanner 210 into a digital image.

Portable scanner module 40 has a user interface 290 with human interface features allowing a user to input information in a way that can be detected by controller 260 and a display 310 allowing portable scanner module 40 to provide information to the user. Display 310 can comprise a status indicator such as a visible signal or icon, text messages, or images. In the embodiment shown in FIG. 13, an optional display driver 300 is provided and can comprise any circuit or system that can be used to receive signals from controller 260 and to convert these signals into a form that can be used by display 310 to present information to a user of portable scanner module 40. Where docking station 70 has user interface features or a display, docking station 70 can be adapted to provide and receive signals by way of docking station interface 70 so that controller 260 can use user interface and display features of the docking station to facilitate human interaction.

During an image capture operation, sensors (not shown) detect when an image bearing medium 100 is inserted into print feed slot 50 and provide a signal to controller 260 indicating that an image bearing medium 100 is positioned to capture an image. Alternatively a user can use user interface 290 to provide a signal to controller 260 indicating that the user is ready to initiate a scanning process. Controller 260, scanner driver 220, and a print feed motor 230 and medium contact elements such as rollers 370 or 380 shown in FIG. 14, then cooperate to establish a feed rate for moving image bearing medium 100 relative to image scanner 210 and a scanning rate for scanning the image information. As image bearing medium 100 moves relative to the image scanner 210 individual lines of image data are recorded. The position of image bearing medium 100 relative to scanner 210 can be determined from "on the fly" image analysis or via position information obtained from the print feed motor driver 230 as from the medium contact elements in order to ensure that the scanning of the image renders raw image data that is captured from the original image that is complete, properly coordinated, and aligned.

In the embodiment that is shown in FIG. 13, scanner module 40 has an optional digital to analog signal converter 265 for converting digital images into a form that can be viewed on analog display devices such as a an analog television.

Also shown in FIG. 13 is an option analog to digital conversion system 268 that can be used, for example, to convert audio signals into digital data for image annotation purposes. Analog to signal digital conversion system 268 can also take on other forms such as a keypad, stylus, joystick, trackball, or any other transducer that is capable of converting analog input into a digital form.

Figure 14:
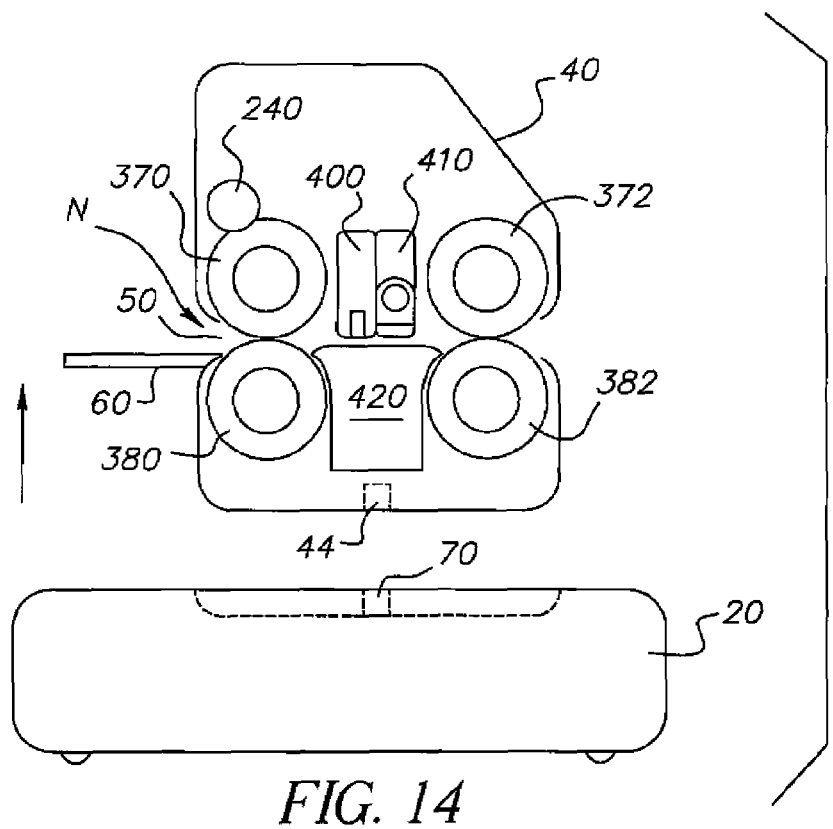
FIG. 14 is a schematic cut away side view of a portable scanner module removed from a digital camera charging and image transfer dock.

FIG. 14 is a schematic cut away side view of a portable scanner module 40 removed from a digital camera charging and image transfer dock 20. Print feed slot 50 and print feed guide 60 are used to present a print to a nip N formed between medium contact elements shown in this embodiment as upper feed/transport roller 370 and lower feed/transport roller 380. The opposed roller sets 370 and 380 are spring loaded to conform to various media thicknesses. Once caught in variable nip N the rollers 370 drive the image bearing medium 100 under an image scanning unit 400 having image scanner 210 and scanner driver 220 therein and illumination for the print is provided by media illuminator 410. The print is supported by media support platen 420 until the print progresses to the second roller set 372 and 382 the distance of this gap is preferably under 1.5" to accommodate small images such as slides with out the requirement for a slide carrier or attachment. In this configuration transparency type media, such as photographic slides and microfilms, would be illuminated from light generated by media illuminator 410 reflecting off of media support platen 420. Portable scanner module 40 connects to camera charging and image transfer dock 20 via docking station interface 70 and scanner interface 44.

Figure 15:
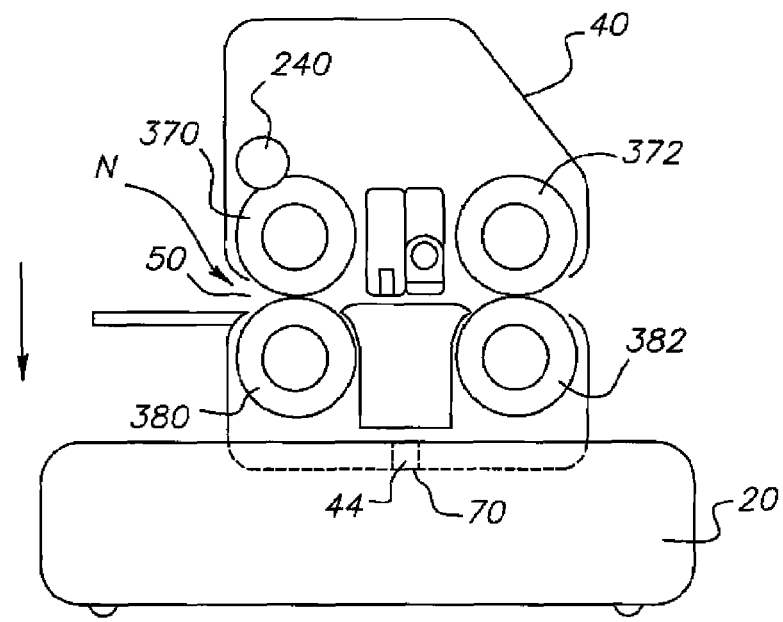
FIG. 15 is a schematic cut away side view of a portable scanner module attached to a digital camera charging and image transfer dock.

FIG. 15 is a schematic cut away side view of a portable scanner module 40 attached to a digital camera charging and image transfer dock.

Figure 16:
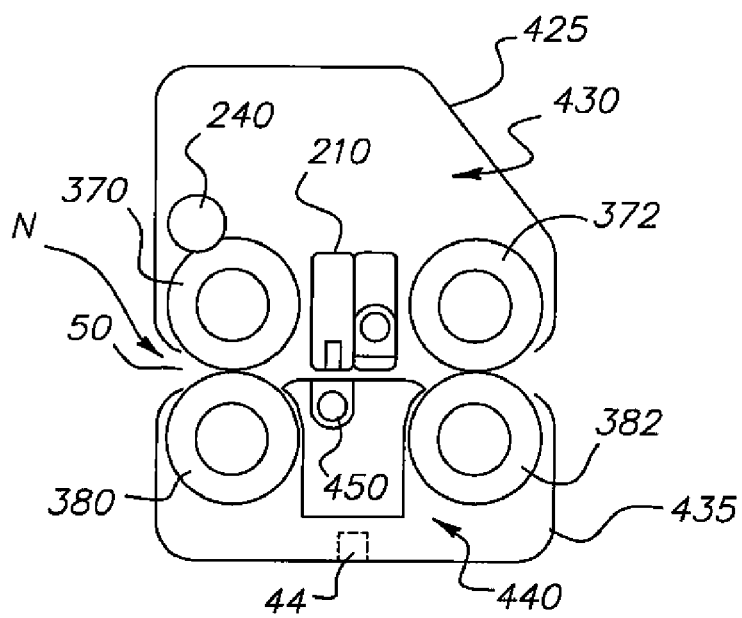
FIG. 16 is a schematic cut away side view of a portable scanner module in the print feeder configuration.

FIG. 16 is a schematic cut away side view of portable scanner module 40 in the print feeder configuration, which is used to scan an image bearing medium 100 that is sized at or below a maximum allowable media width. In this configuration image bearing mediums within the width requirements will feed, scan, and transport automatically. Also depicted is optional transparency illuminator 450, which is located below image scanning unit 400. If optional illuminator 450 is included it would be energized if transparency is detected or indicated by the user.

In this way, reflection and transparency scanning capability can be accomplished by the two independent light sources or by using the supporting media platen incorporating a reflective surface. The linear array scanner can determine if the media is of the reflection or transparency type and can also determine if the transparency media is positive or negative. The linear array scanner works collaboratively with the transport system, moving the media in step with sequential scans. The transport mechanism is spring loaded and automatically adjusting to accommodate different thicknesses of individual image bearing medium 100. In the case of mounted slides the scanner differentiates between the transparent image area and the opaque slide mount.

The portable scanner module 40, shown in FIGS. 14, 15, or 16, has a scanner module body 425 that holds selected structures of the scanner module 40 described above with reference to FIG. 13. Scanner module body 425 is joined to but separable from a base 435, so that the scanner module 40 can be separated into two sections, an upper scanner module 430 and lower scanner module 440. Upper scanner module 430 contains the electronic components described above that are necessary so that the upper scanner module 430 can operate to scan images independently of lower scanner module 440.

Figure 17A:
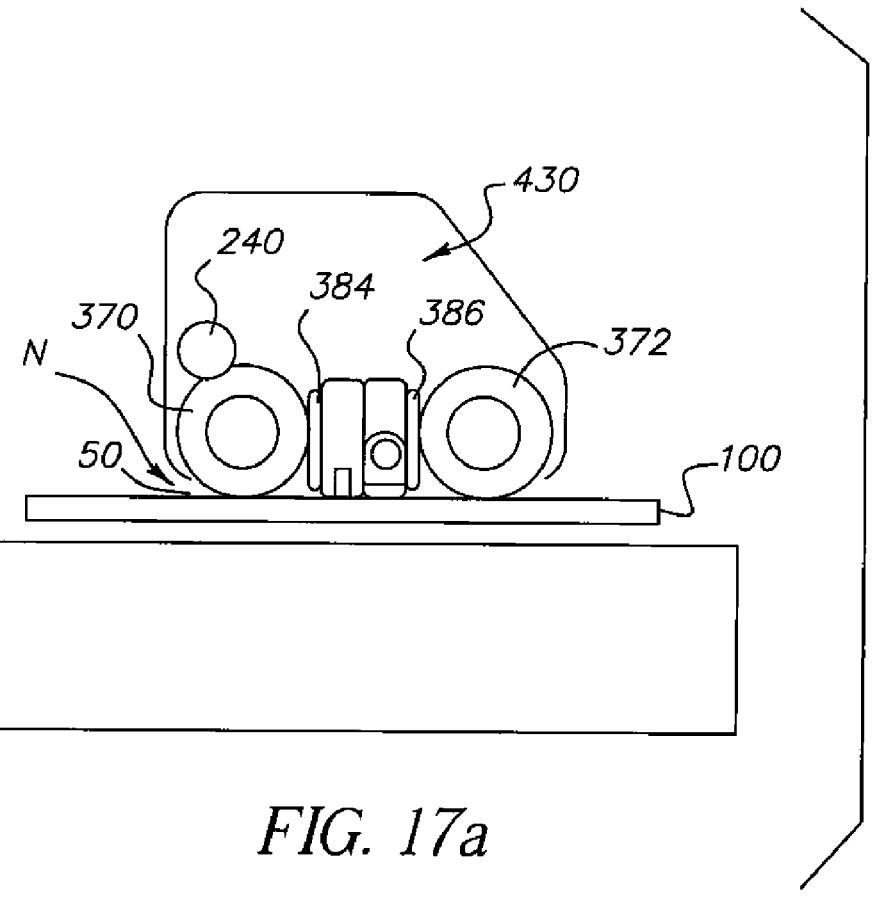
FIG. 17a is a schematic cut away side view of a portable scanner module in the manual print scanner configuration.

FIG. 17a is a schematic cut away side view of a portable scanner module 40 without base 435 attached thereto. In this configuration, the upper scanner module 430 can be used to scan an image bearing medium 100 that is wider than a maximum media width.

Figure 17B:
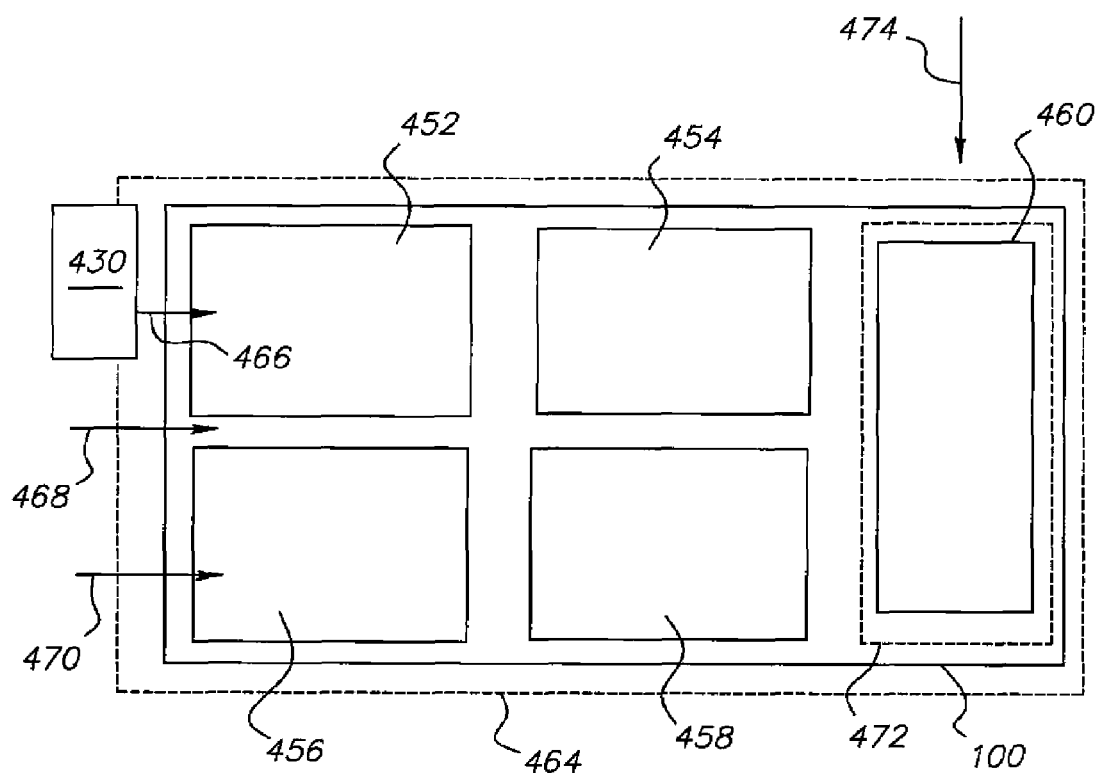
FIG. 17b illustrates an image-bearing medium scanned by an upper scanning module.

One example of such an image-bearing medium 100 is illustrated in FIG. 17b. As is shown in FIG. 17b, image-bearing medium 100 comprises a single page of medium having multiple images 452, 454, 456, 458 and 460 thereon. A user of scanner module 40 in the manual configuration manually positions upper scanner module 430 at an edge of an area 464 of image bearing medium 100 to be scanned, and manually advances the upper scanner module 430 across the area to be scanned along a first path 466. Where the area to be scanned is wider than the maximum scanner width, the upper scanner module 430 can be returned to a start position and manually scanned along other scan paths (e.g. paths 468, 470 and 474) of the medium until all portions of image bearing medium 100 have been scanned. This can be done, for example, to enable scanning of oversized images or to allow scanning of oversized images, or to allow scanning of a scanning area that incorporates the entire image bearing medium 100 such as to capture an image of an entire scrapbook page. In this example, the user of upper scanner module 430 manually guides the upper scanner module 430 over the wider media in a series of overlapping sections, which will be digitally "stitched" by the microprocessor 260 (not shown). In this way upper scanner module 430 can be dragged over image bearing medium 100 by the user and feedback from the un-powered drive motor 370 can be used to determine the scanner position and rate of movement.

Alternatively, scanner module 40 can be used to obtain images of only a portion of image bearing mediums 100. For example, a user can select an individual image such as image 460 and can cause scanner module 430 to scan image 460 along scan path 474 to obtain an image of scan area 472 from which image 460 can be extracted.

In an alternative embodiment, the upper scanner module 430 can traverse the surface of an image bearing medium by activating print feed motor 240 to rotate upper feed rollers 370 and 372 to cause upper scanner module 430 to advance along image bearing medium 100. Upper scanner module 430 can automatically advance along one axis of an image-bearing medium using feed rollers 370 and 372 that are otherwise used to transport the image bearing medium 100 in the automatic mode now to move the upper scanner module 430. Optionally, a set of extractable transverse powered rollers 384 and 386 can be provided to move upper scanner module along another axis of the image-bearing medium. Where such a combination of powered rollers 370 and transverse powered rollers 384 and 386 is used, controller 260 can cause an image to be scanned following a predetermined set of rules for ensuring that scanner path moves over the entire surface of the image-bearing medium 100.

Figure 18:
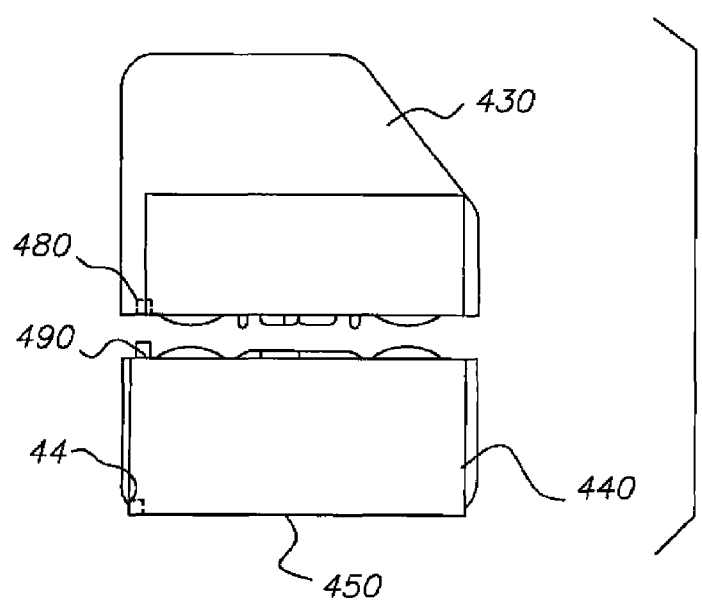
FIG. 18 illustrates an upper scanning housing and lower scanning housing adapted to communicate using terminals.

It will be appreciated that in the embodiment of FIGS. 16 and 17*a*, scanner interface 44 is shown located on lower scanner module 440. Accordingly, in this embodiment, upper scanner module 440 is connected to lower scanner module in a manner that allows for data and/or power to be transferred from lower scanner module 440 to upper scanner module 430. This can be done, as is illustrated in FIG. 18, by providing an upper scanner module connector 480 that is adapted to engage a lower scanner module connector 490 on the lower scanner module 440. In one embodiment, the upper scanner module connector 480 matches the scanner module interface 44 so that the upper scanner module 470 can engage the docking station interface 70 directly thereby acting as scanner module interface 44 or by way of the lower scanner module terminal 490. In such an embodiment, lower scanner module 490 can match docking station interface 70.

Figure 19:
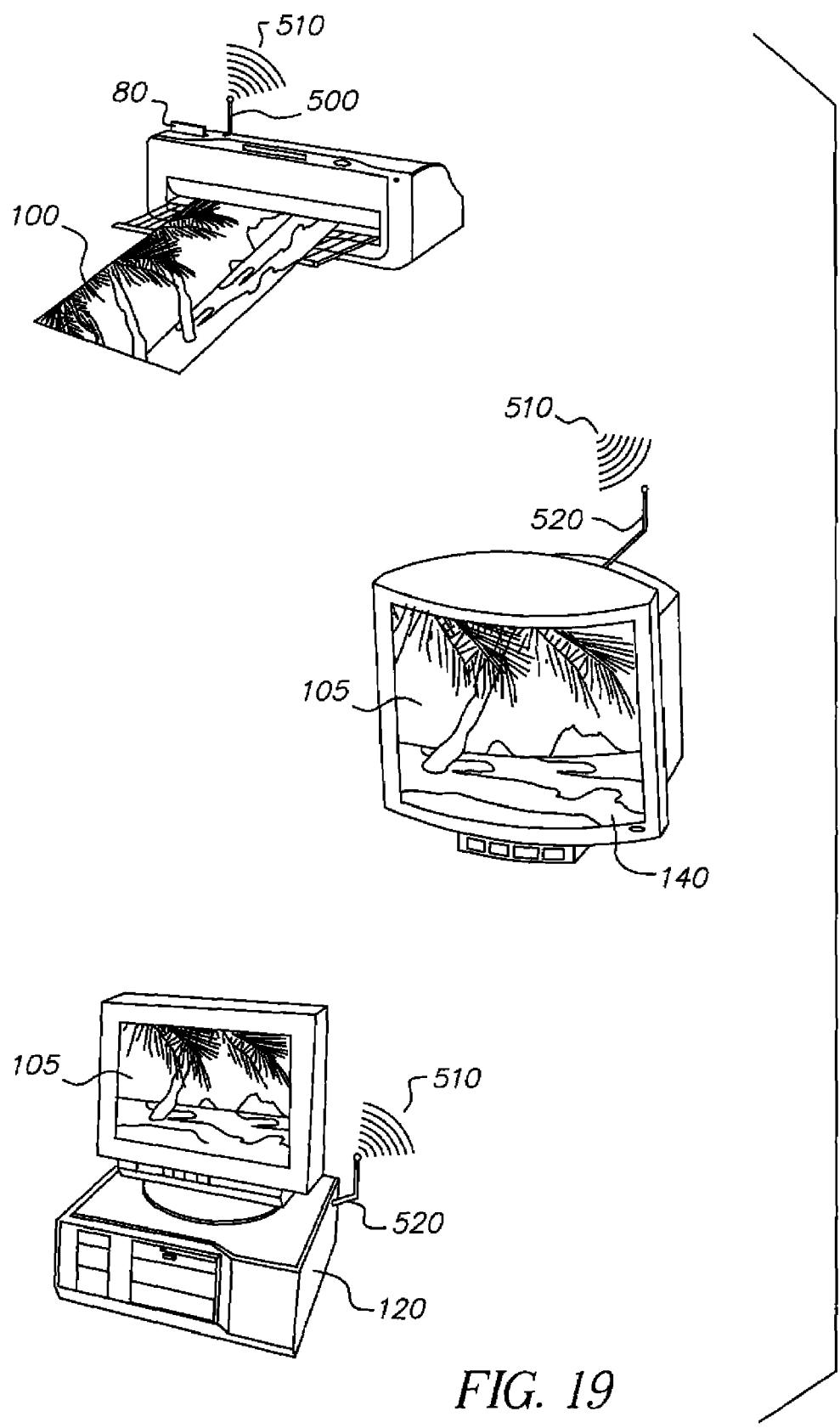
FIG. 19 is a perspective illustration of a portable scanner module in the process of transporting and scanning a print and using an optional wireless image transfer attachment to transfer the scanned image to a computer and television monitor.

FIG. 19 is a perspective illustration of a portable scanner module 40 in the process of transporting and scanning an image bearing medium and using an optional wireless image transfer attachment to transfer the scanned image to a computer and television monitor. In the embodiment illustrated, portable scanner module 40 is configured with an optional digital radio frequency transceiver 500 such as a WiFi, Bluetooth or with a light transceiver, such as an IrDA transceiver. The digital image scan of image bearing medium 100 is stored on removable memory device 80 and then transmitted via digital radio signal 510. The digital signal 170 is received by digital receiver 520 where the digital signal is converted to an analog signal with is displayed as soft display image 105 on a television monitor 140. Television monitor 140 can be of an analog or a digital type. Television 140 is of the analog type, digital receiver 520 can be adapted to convert digital signal 510 into an appropriate analog signal. Digital signal 510 is received by a digital receiver 520 that is connected to computer 120 and stored in memory, not shown. Soft display image 105 is displayed on monitor 125 of computer 120.

Figure 20:
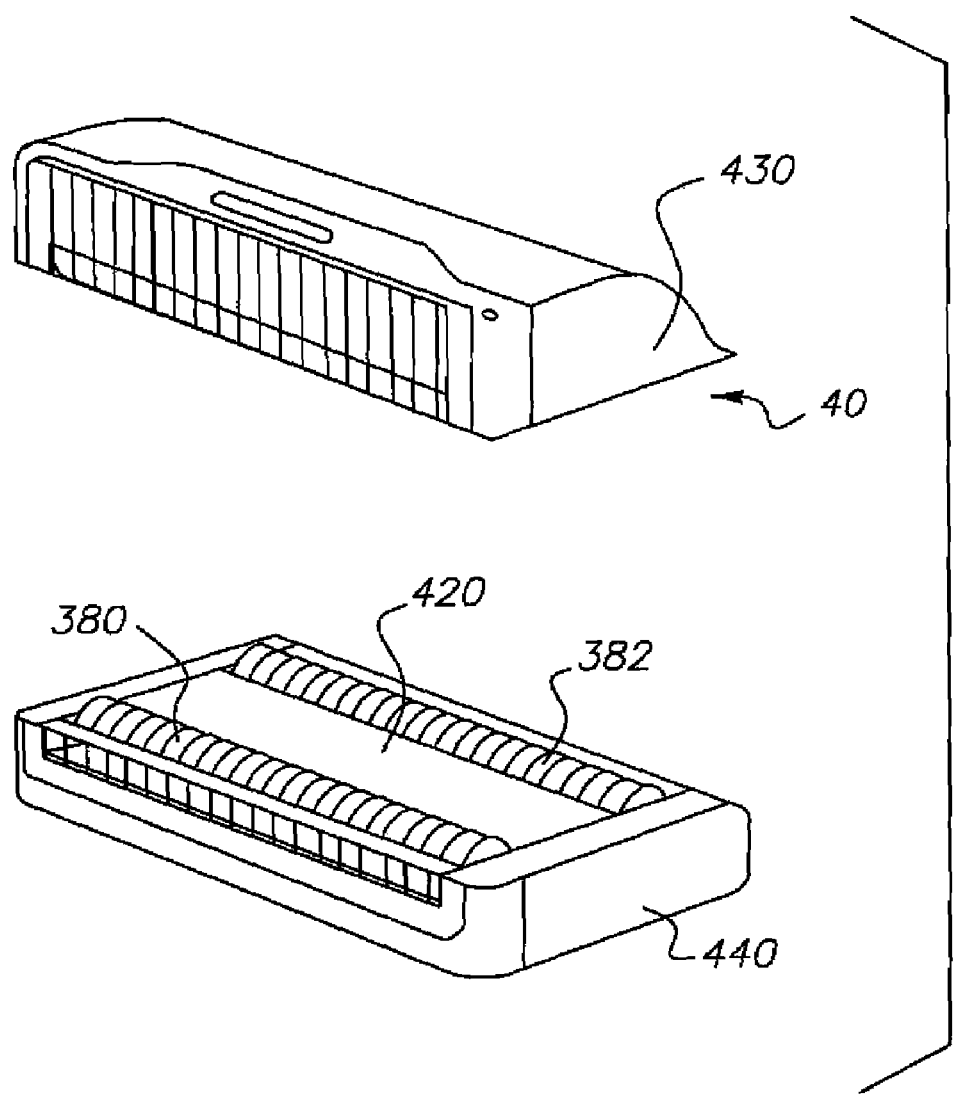
FIG. 20 is a perspective illustration of a portable scanner module in the manual print scanner configuration.

FIG. 20 is a perspective illustration of a portable scanner module in the manual print scanner configuration. Upper scanner module 430 of portable scanner module 40 is separated from lower scanner module 440. Visible in the illustration are lower feed/transport rollers 380/382 and media support platen 420.

Although docking stations 20 and 30 described herein are described as having a docking station interface 70 that is adapted to engage an interface on a digital camera, it will be appreciated that the system described herein is applicable for use with any docking station that can be used to convey images and related data to and/or from any imaging device including any electronic device having images stored therein including, but not limited to, cellular phones, personal digital assistants, personal computers, and image players.

FIGS. 16-20 have shown an embodiment of the invention wherein a drive motor system is in the body of upper scanner module 430. However, in an alternative embodiment, drive motor system can be located in lower module 440, so as to reduce the weight or cost of upper scanner module 430.

In various embodiments described above, docking stations 20 and 30 have been shown connected to personal computing devices such as the ubiquitous desktop personal computer. However, it will be appreciated that docking stations such as docking stations 20 and 30 can also be used in conjunction with other devices such as mobile personal computers, hand held computing devices and information appliances generally in the same manner as is described herein with reference to computer 120.

The invention has been described in detail with particular reference to certain preferred embodiments thereof, but it will be understood that variations and modifications can be effected within the spirit and scope of the invention.

PARTS LIST

10 Digital camera
15 Digital image on camera screen
20 Camera charging and image transfer dock
25 Print
30 Camera charging, transfer, and printing dock
40 Portable scanner module
42 Scanner module body
44 Scanner interface
50 Print feed slot
60 Print feed guide
70 Dock station interface
80 Removable memory device
90 Removable memory device slot connector
100 Image bearing medium
105 Soft display of digital image
110 Digital signal cable
120 Home computer
130 Analog signal cable
140 Television monitor 150 Duplicate print
160 Rf data transmitter wireless accessory
170 Rf signal
180 User interface
190 Indicator light
200 Removable memory device
210 Image scanner
220 Scanner driver component
230 Print feed motor driver component
240 Print feed motor component
250 Memory connector component
260 Micro processor component
265 Digital to analog image signal converter
270 USB driver component
280 USB connector component
290 User interface component
300 Status indicator/display driver component
310 Status indicator/display component
320 Voltage converter component
340 Rechargeable battery component
360 External power supply component
370 Upper rollers
372 Upper medium contact
380 Lower rollers
382 Lower medium contact
384 powered transverse rollers
386 powered transverse rollers
390 Portable scanner module data/power interface
400 image scanning unit
410 Media illuminator
420 Media support platen
425 Body
430 Upper scanner module
435 Base
440 Lower scanner module
450 Optional transparency illuminator
452 Image
454 Image
456 Image
458 Image
460 Image
462 Scan area
466 Scan path
468 Scan path
470 Scan path
472 Scan path
474 Scan path
500 Analog Rf data receiver
510 Digital Rf signal
520 Digital Rf data receiver
N Nip

The invention claimed is:

1. A scanner module for use with a docking station having a docking station interface adapted to receive an interface of a camera; the scanner module comprising:
an image-scanning unit adapted to form an image of a medium;
a controller to controllably cause the image scanning unit to capture an image of the medium and to store the captured image as image data in a memory; and
a scanner interface adapted so that it can be received by the docking station interface;
wherein the controller is connected to the scanner interface and adapted to send image data from the memory through the docking station interface in a manner that emulates the manner in which the camera sends image data through the docking station interface; and
wherein the controller is further adapted to receive signals from docking station interface adapted for use by the controller of the scanner and not by a controller of the camera.

2. The scanner module of claim 1, wherein the docking station is adapted to use the docking station interface to provide recharging power to the imaging device, said power being calibrated to charge a rechargeable battery in the imaging device, and wherein the scanner interface is adapted to provide the recharging power to a rechargeable power source in the scanner module, with said scanner module being adapted to use power provided by the rechargeable power source to capture and store images.

3. The scanner module of claim 1, wherein the controller is adapted to detect control signals sent through the docking station interface and the controller is adapted to interpret the control signals and to respond thereto in a manner that is consistent with the way in which the imaging device would respond to the same signals.

4. The scanner module of claim 1, wherein the controller is adapted to process images captured by the image-scanning unit and to store the processed images as image data in the memory.

5. The scanner module of claim 1, wherein the scanner module has a memory interface adapted to receive a memory that is separable from the scanner module and wherein the controller is adapted to store images in the separable memory.

6. The scanner module of claim 1, wherein the scanner module has a communication circuit adapted to generate signals and to transmit the signals to another device using a communication system that does not use the scanner interface.

7. The scanner module of claim 1, wherein the docking station comprises a printer having a processor that uses the docking station interface to obtain images from the memory and to generate prints using the obtained images.

8. The scanner module of claim 1 wherein the controller is adapted to provide a signal to the docking station interface indicating that a scanner is located in the docking station interface.

9. The scanner module of claim 1, wherein the controller is adapted to store scanned images in the memory in a format that is consistent with the format used to store images by the imaging device.

10. A scanner module comprising:
a scanner body having:
an image scanning unit having an imager and associated circuits capable of forming images of a medium;
a scanner interface adapted to be received by a docking station interface for a camera;
a controller adapted to operate the image scanning unit to controllably cause the image scanning unit to capture images of the medium and to store the captured images as image data in a memory, the controller being connected to the scanner interface and adapted to exchange data with another electronic device by way of the scanner interface and the docking station interface and by emulating the way in which the camera exchanges data using the docking station interface; and
a power source operatively connected to the image scanning unit and the controller to provide power sufficient to scan at least one image of the medium and to store at least one image in the memory;
wherein said body is adapted to separably engage a base to define a medium transport path between the base and the scanner body farther comprising a first medium movement mechanism comprising a set of body contact elements adapted to contact a medium positioned for scanning and a sensor adapted to detect relative movement of the medium and scanner module.

11. The scanner module of claim 10, wherein the sensor detects relative movement of the medium by sensing movement of one of the body contact elements.

12. The scanner module of claim 10, wherein the controller is adapted to enable automatic image scanning through the scan path of mediums sized to pass through the scan path; when the base is attached to the body and for scanning of mediums that are larger than the scan path when the base is not attached to the body.

13. The scanner module of claim 10, farther wherein the base has a set of contact elements adapted to contact the medium to facilitate the movement of the medium through the transport path.

14. The scanner module of claim 10, farther comprising a drive motor system operable by the controller to controllably move at least one of the body contact elements and the base contact elements so as to controllably advance the medium relative to the image-scanning unit.

15. The scanner module of claim 14, wherein the drive system is within the body and drives body contact elements.

16. The scanner module of claim 15, wherein the controller is adapted to drive the body contact elements to move the body along a first path relative to a medium.

17. The scanner module of claim 16, farther comprising a set of transverse contact elements connected to the body and to the drive motor to advance the body along a second path that is not aligned with the first path, wherein the controller is adapted to automatically use the body contact elements and transverse contact elements to automatically move the body to scan an area of a medium.

18. The scanner module of claim 17, wherein the controller is further adapted to cause the scanner module to move across all areas of a medium that is larger than a scanning area of the scanner so that imaging information is assembled for all such areas and to assemble an image of the medium using the information scanned during such movement.

19. The scanner module of claim 17, wherein the controller is further adapted to cause the scanner module to move across all areas of a medium that is larger than a scanning area of the scanner so that imaging information is assembled for all such areas and provide information from which an image of the surface information scanned during such movement can be assembled.

20. The scanner module of claim 14, wherein the controller is adapted to allow image scanning in an automatic mode when the base is attached to the housing and in a manual mode when the base is not attached to the housing, and wherein the drive system comprises an electric motor associated with one of the contact elements so that movement when the scanner is operated in the manual mode, the scanner module can be placed so that the contact element attached to the motor is in contact with the at least one medium to be scanned and wherein controller can monitor the movement of the scanner module relative to the medium based upon electrical signals generated by the electric motor as the medium is moved in the manual mode.

21. The scanner module of claim 10, wherein said body further comprises the scanner interface.

22. The scanner module of claim 10, wherein the base comprises the scanner interface and wherein the base has a base terminal and the body has a body terminal that is adapted to interface the base terminal with the base terminal being operatively connected to the scanner interface so that data or power connections can be conveyed from the docking station interface to the power source scanner module.

23. The scanner module of claim 10, further comprising at least one of a radio frequency or light signal communication system adapted to exchange information with another electronic device.

24. The scanner module of claim 10, wherein the power source comprises a rechargeable battery capable of storing at least enough power to permit the scanner module to scan at least one medium.

25. The scanner module of claim 10, wherein the docking station provides a source of power suitable for recharging a power supply in the imaging device but that is not sufficient to operate the scanner module, wherein the power supply having power therein and in the scanner module the scanner module is adapted to use a combination of power from the power supply and power source for image scanning when the scanner module is joined to the docking station.

26. The scanner module of claim 10, further comprising an analog to digital conversion system for converting user actions into information that can be used by the controller.

27. The scanner module of claim 10, further comprising an analog to digital conversion system for converting audio signals into data that can be associated with images being scanned.

* * * * *